(12) United States Patent
Kray et al.

(10) Patent No.: US 10,746,045 B2
(45) Date of Patent: Aug. 18, 2020

(54) FRANGIBLE GAS TURBINE ENGINE AIRFOIL INCLUDING A RETAINING MEMBER

(71) Applicant: General Electric Company, Schenectady, NY (US)

(72) Inventors: Nicholas Joseph Kray, Mason, OH (US); Nitesh Jain, Bangalore (IN)

(73) Assignee: General Electric Company, Schenectady, NY (US)

(*) Notice: Subject to any disclaimer, the term of this patent is extended or adjusted under 35 U.S.C. 154(b) by 86 days.

(21) Appl. No.: 16/161,270

(22) Filed: Oct. 16, 2018

(65) Prior Publication Data

US 2020/0116046 A1    Apr. 16, 2020

(51) Int. Cl.
*F01D 21/04* (2006.01)
*F01D 5/28* (2006.01)
*F01D 5/14* (2006.01)

(52) U.S. Cl.
CPC .......... *F01D 21/045* (2013.01); *F01D 5/147* (2013.01); *F01D 5/282* (2013.01); *F05D 2240/307* (2013.01); *F05D 2300/603* (2013.01)

(58) Field of Classification Search
CPC .......... F01D 21/04; F01D 21/045; F01D 5/14; F01D 5/147; F01D 5/282; F01D 5/284; F04D 29/324; F04D 29/325; F04D 29/38; F04D 29/384; F04D 29/388; F05D 2240/307; F05D 2300/603; F05D 2300/6033
See application file for complete search history.

(56) References Cited

U.S. PATENT DOCUMENTS

| 3,096,930 A | 7/1963 | Meyerhoff |
| 3,156,808 A | 11/1964 | Davies et al. |
| 3,175,804 A | 3/1965 | Bunger |

(Continued)

FOREIGN PATENT DOCUMENTS

| CN | 103628923 B | 3/2016 |
| EP | 0526057 A1 | 2/1993 |

(Continued)

OTHER PUBLICATIONS

Volume-Issue Number, Location Published, Date, Pages.

*Primary Examiner* — Moshe Wilensky
*Assistant Examiner* — Elton K Wong
(74) *Attorney, Agent, or Firm* — Dority & Manning, P.A.

(57) ABSTRACT

An airfoil defining a span extending between a root and a tip. The airfoil includes a retaining member extending at least partially between a leading edge and a trailing edge defining a frangible line extending at least partially along a chord at a point along the span of the retaining member. The airfoil further includes a frangible airfoil portion extending between the tip and the frangible line. The frangible airfoil portion includes a first plurality of composite plies, at least one composite ply of the first plurality of composite plies wraps around the retaining member. The airfoil includes a residual airfoil portion extending from the frangible line to the root including a second plurality of composite plies, at least one composite ply of the second plurality of composite plies wraps around the retaining member. Further, the residual airfoil portion meets the frangible airfoil portion at the frangible line.

20 Claims, 7 Drawing Sheets

(56) References Cited

U.S. PATENT DOCUMENTS

| | | |
|---|---|---|
| 3,394,918 A | 7/1968 | Wiseman |
| 3,626,568 A | 12/1971 | Silverstein et al. |
| 3,761,201 A | 9/1973 | Silverstein et al. |
| 4,000,956 A | 1/1977 | Carlson et al. |
| 4,022,540 A | 5/1977 | Young |
| 4,022,547 A | 5/1977 | Stanley |
| 4,043,703 A | 8/1977 | Carlson |
| 4,071,184 A | 1/1978 | Carlson et al. |
| 4,111,600 A | 9/1978 | Rothman et al. |
| 4,426,193 A | 1/1984 | Carlson |
| D273,037 S | 3/1984 | Dodge |
| 4,971,641 A | 11/1990 | Nelson et al. |
| 5,112,194 A | 5/1992 | More |
| 5,123,813 A | 6/1992 | Przytulski et al. |
| 5,129,787 A | 7/1992 | Violette et al. |
| 5,141,400 A | 8/1992 | Murphy et al. |
| 5,222,297 A | 6/1993 | Graff et al. |
| 5,269,658 A | 12/1993 | Carlson et al. |
| 5,354,176 A * | 10/1994 | Schilling ............ B64C 11/04 416/204 A |
| 5,363,554 A | 11/1994 | Partridge et al. |
| 5,375,978 A | 12/1994 | Evans et al. |
| 5,392,514 A | 2/1995 | Cook et al. |
| 5,449,273 A | 9/1995 | Hertel et al. |
| 5,486,096 A | 1/1996 | Hertel et al. |
| 5,520,532 A | 5/1996 | Reinfelder et al. |
| 5,580,217 A | 12/1996 | Richards et al. |
| 5,738,491 A | 4/1998 | Lee et al. |
| 5,836,744 A | 11/1998 | Zipps et al. |
| 5,843,354 A | 12/1998 | Evans et al. |
| 5,844,669 A | 12/1998 | Wang et al. |
| 5,908,285 A | 6/1999 | Graff |
| 5,935,360 A | 8/1999 | Griggs |
| 5,939,006 A | 8/1999 | Wang et al. |
| 6,146,099 A | 11/2000 | Zipps et al. |
| 6,241,469 B1 | 6/2001 | Beeck et al. |
| 6,290,895 B1 | 9/2001 | Wang et al. |
| 6,294,113 B1 | 9/2001 | Woodmansee et al. |
| 6,402,469 B1 | 6/2002 | Kastl et al. |
| 6,413,051 B1 | 7/2002 | Chou et al. |
| 6,516,865 B1 | 2/2003 | Beeck et al. |
| 6,709,230 B2 | 3/2004 | Morrison et al. |
| 6,843,565 B2 | 1/2005 | Evans et al. |
| 7,114,912 B2 | 10/2006 | Gerez et al. |
| 7,736,130 B2 | 6/2010 | Schilling et al. |
| 7,780,410 B2 | 8/2010 | Kray et al. |
| 7,794,197 B2 | 9/2010 | Thompson et al. |
| 7,837,446 B2 | 11/2010 | McMillan |
| 7,972,109 B2 | 7/2011 | Crall et al. |
| 8,038,408 B2 | 10/2011 | McMillan |
| 8,083,487 B2 | 12/2011 | Wood et al. |
| 8,100,662 B2 | 1/2012 | Schreiber |
| 8,109,734 B2 | 2/2012 | Backhouse |
| 8,146,250 B2 | 4/2012 | Moroso |
| 8,234,990 B2 | 8/2012 | Xie et al. |
| 8,251,640 B2 | 8/2012 | Beckford et al. |
| 8,366,378 B2 | 2/2013 | Beckford et al. |
| 8,459,955 B2 | 6/2013 | McMillan et al. |
| 8,573,936 B2 | 11/2013 | Lafont |
| 8,647,072 B2 | 2/2014 | McMillan |
| 8,685,297 B2 | 4/2014 | Schreiber |
| 9,085,989 B2 | 7/2015 | Shah et al. |
| 9,157,139 B2 | 10/2015 | Rajagopalan |
| 9,321,100 B2 | 4/2016 | Dambrine et al. |
| 9,410,437 B2 | 8/2016 | Paige et al. |
| 9,475,119 B2 | 10/2016 | Cui et al. |
| 9,556,742 B2 | 1/2017 | Parkin et al. |
| 9,689,269 B2 | 6/2017 | Bottome |
| 9,878,501 B2 | 1/2018 | Zatorski et al. |
| 9,914,282 B2 | 3/2018 | Roach et al. |
| 9,945,234 B2 | 4/2018 | Jevons et al. |
| 9,995,164 B2 | 6/2018 | Nishijima et al. |
| 2006/0188736 A1 | 8/2006 | Luthra et al. |
| 2007/0036658 A1 | 2/2007 | Morris |
| 2007/0202296 A1 | 8/2007 | Chandrasekaran et al. |
| 2008/0273983 A1 | 11/2008 | Clark et al. |
| 2009/0035131 A1 | 2/2009 | McMillan |
| 2009/0269203 A1 | 10/2009 | Care et al. |
| 2010/0054937 A1 | 3/2010 | Beckford et al. |
| 2010/0150707 A1 | 6/2010 | Jevons |
| 2010/0242843 A1 | 9/2010 | Peretti et al. |
| 2010/0296942 A1 | 11/2010 | Jevons |
| 2011/0023301 A1 | 2/2011 | Jones |
| 2011/0027096 A1 | 2/2011 | Northfield |
| 2011/0049297 A1 | 3/2011 | Jevons et al. |
| 2011/0052405 A1 | 3/2011 | Parkin |
| 2011/0129351 A1 | 6/2011 | Das et al. |
| 2011/0182743 A1 | 7/2011 | Naik |
| 2011/0194941 A1 | 8/2011 | Parkin et al. |
| 2011/0217160 A1 | 9/2011 | McMillan |
| 2011/0223027 A1 | 9/2011 | Klinetob et al. |
| 2011/0299990 A1 | 12/2011 | Marra et al. |
| 2012/0003100 A1 | 1/2012 | James et al. |
| 2012/0021243 A1 | 1/2012 | Kray et al. |
| 2012/0028055 A1 | 2/2012 | Schmidt |
| 2012/0034089 A1 | 2/2012 | Wadewitz et al. |
| 2012/0051935 A1 | 3/2012 | Naik et al. |
| 2012/0082556 A1 | 4/2012 | Macchia et al. |
| 2012/0100006 A1 | 4/2012 | Merriman et al. |
| 2015/0218953 A1 | 8/2015 | Bottome |
| 2016/0123159 A1 | 5/2016 | Thompson |
| 2016/0167269 A1 | 6/2016 | Pautard |
| 2016/0263856 A1 * | 9/2016 | Roach ............ B32B 5/145 |
| 2017/0057201 A1 * | 3/2017 | M'membe ............ B32B 7/08 |
| 2017/0226867 A1 | 8/2017 | Nandula et al. |
| 2017/0254207 A1 | 9/2017 | Schetzel et al. |
| 2017/0321714 A1 | 11/2017 | Jain et al. |
| 2017/0335856 A1 | 11/2017 | Lander et al. |
| 2017/0363062 A1 | 12/2017 | Merzhaeuser et al. |
| 2017/0370376 A1 | 12/2017 | Kray et al. |
| 2018/0119551 A1 | 5/2018 | Romero et al. |
| 2018/0178489 A1 | 6/2018 | M'Membe et al. |

FOREIGN PATENT DOCUMENTS

| | | |
|---|---|---|
| FR | 2953225 A1 | 6/2011 |
| FR | 2994708 A1 | 2/2014 |
| GB | 2450139 A | 12/2008 |
| JP | 2001041002 A | 2/2001 |
| WO | WO2008122751 A2 | 10/2008 |

* cited by examiner

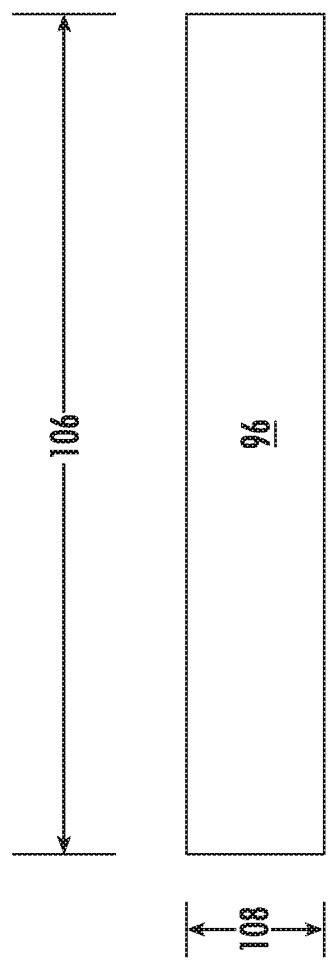
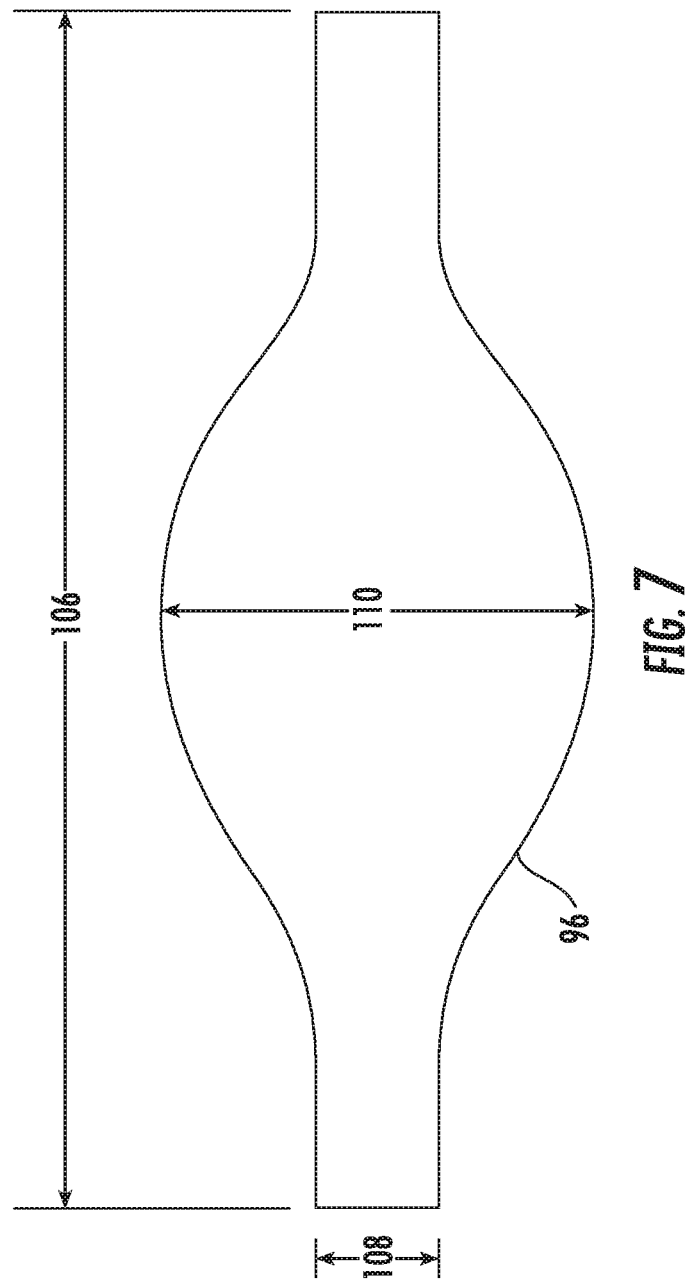

FRANGIBLE GAS TURBINE ENGINE AIRFOIL INCLUDING A RETAINING MEMBER

FIELD

The present subject matter relates generally to airfoils, and more particularly, to frangible airfoils for gas turbine engines including a retaining member extending between leading and trailing edges.

BACKGROUND

Airfoils used in aircraft engines, such as fan blades of a gas turbine engine, can be susceptible to extreme loading events. For instance, a fan blade might strike a bird that is ingested into the engine, or a blade-out occurrence may arise wherein one of the fan blades is severed from a rotor disk. If the impact is large enough, a fan blade may break apart into one or more shards before traveling downstream through the engine.

Gas turbine engines, such as turbofans, generally include fan cases surrounding a fan assembly including the fan blades. The fan cases are generally configured to withstand an impact of the fan blades due to adverse engine conditions resulting in a failure mode, such as foreign object damage, hard rubs due to excessive or extreme unbalance or fan rotor oscillations, or fan blade liberation. However, such airfoil configurations generally increase the weight of the fan case, thereby increasing the weight of the engine and aircraft and reducing performance and efficiency.

Known fan cases generally include frangible structures, such as honeycombs or trench-filler material, configured to mitigate load transfer to and through the fan case. However, this approach is generally costly. Furthermore, this approach may result in larger, heavier, less efficient fan cases. Still further, this approach may not address issues relating to fan rotor unbalance following deformation or liberation of one or several airfoils such as fan blades.

As such, there is a need for an airfoil that enables a controlled and consistent failure mode of the airfoil that may enable reducing a cost, weight, and load transfer to a surrounding casing.

BRIEF DESCRIPTION

Aspects and advantages will be set forth in part in the following description, or may be obvious from the description, or may be learned through practice of the invention.

In one aspect, the present subject matter is directed to an airfoil defining a span extending between a root and a tip and a chord at each point along the span extending between a leading edge and a trailing edge. The airfoil includes a retaining member extending at least partially between the leading edge and the trailing edge. The retaining member defines a frangible line extending at least partially along the chord at a point along the span of the retaining member. The airfoil further includes a frangible airfoil portion extending between the leading edge and the trailing edge and extending between the tip and the frangible line along the span. The frangible airfoil portion includes a first plurality of composite plies. Further, at least one composite ply of the first plurality of composite plies wraps around the retaining member. The airfoil further includes a residual airfoil portion extending from the frangible line to the root along the span. The residual airfoil portion includes a second plurality of composite plies. At least one composite ply of the second plurality of composite plies wraps around the retaining member. Further, the residual airfoil portion meets the frangible airfoil portion at the frangible line.

In one embodiment, the frangible airfoil portion may deform or partially or fully detach relative to the residual airfoil portion at the frangible line following an event creating imbalance. In a further embodiment, the retaining member may extend parallel to the chord at the point along the span of the retaining member. In other embodiments, the retaining member may define an arc as the retaining member extends at least partially between the leading edge and the trailing edge. In another embodiment, the retaining member may extend at least partially along the span. In one embodiment, the frangible airfoil portion may extend along at least 10% of the span from the tip. In another embodiment, the frangible airfoil portion may extend along at least 15% but less than 50% of the span from the tip. In another embodiment, the retaining member may extend along at least 10% but less than or equal to 100% of the chord at the point along the span of the retaining member. In a further embodiment, the retaining member may extend along at least 30% but less than 80% of the chord at the point along the span of the retaining member.

In another embodiment, the retaining member may define a constant diameter along a length of the retaining member. However, in other embodiments, the retaining member may define a variable diameter along a length of the retaining member. In certain embodiments, the retaining member may include at least one of a metal or a composite.

In a further embodiment, the retaining member may be a first retaining member, and the frangible line may be a first frangible line. In such an embodiment, the airfoil may further include a second retaining member extending at least partially between the leading edge and the trailing edge at a point along the span S between the tip and the point along the span of the first retaining member. Further, the second retaining member may define a second frangible line extending at least partially along the chord at the point along the span of the second retaining member. The first plurality of composite plies may extend between the first frangible line and the second frangible line. At least one composite ply of the first plurality of composite plies may wrap around the second retaining member. Further, in such an embodiment, the frangible airfoil portion may further include a third plurality of composite plies extending between the tip and the second frangible line. At least one of composite ply the third plurality of composite plies may wrap around the second retaining member.

In another such embodiment, the first retaining member may define a first length, and the second retaining member may define a second length different than the first length. In certain embodiments, the second length may be longer than the first length. In one particular embodiment, at least one of the first plurality of composite plies or the second plurality of composite plies may include carbon matrix composite plies. In certain embodiments, the airfoil may be a fan blade of a gas turbine engine.

In another aspect, the present subject matter is directed to a gas turbine engine defining a central axis. The gas turbine engine includes an engine shaft extending along the central axis, a compressor attached to the engine shaft and extending radially about the central axis, a combustor positioned downstream of the compressor to receive a compressed fluid therefrom, a turbine mounted on the engine shaft downstream of the combustor to provide a rotational force to the compressor, and a plurality of airfoils operably connected to the engine shaft. Each of the plurality of airfoils defines a span extending between a root and a tip and a chord at each point along the span extending between a leading edge and a trailing edge.

Each airfoil further includes a retaining member extending at least partially between the leading edge and the trailing edge. The retaining member defines a frangible line extending at least partially along the chord at a point along the span of the retaining member. Each airfoil further includes a frangible airfoil portion extending between the leading edge and the trailing edge and extending between the tip and the frangible line along the span. The frangible airfoil portion includes a first plurality of composite plies. Further, at least one composite ply of the first plurality of composite plies wraps around the retaining member. Each airfoil further includes a residual airfoil portion extending from the frangible line to the root along the span. The residual airfoil portion includes a second plurality of composite plies. At least one composite ply of the second plurality of composite plies wraps around the retaining member. Further, the residual airfoil portion meets the frangible airfoil portion at the frangible line. It should be further understood that the gas turbine engine may further include any of the additional features as described herein.

These and other features, aspects and advantages will become better understood with reference to the following description and appended claims. The accompanying drawings, which are incorporated in and constitute a part of this specification, illustrate embodiments of the invention and, together with the description, serve to explain certain principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended FIGS., in which:

FIG. 6 illustrates one embodiment of a retaining member in accordance with aspects of the present subject matter, particularly illustrating a retaining member defining a constant diameter along a retaining member length;

FIG. 7 illustrates another embodiment of the retaining member in accordance with aspects of the present subject matter, particularly illustrating a retaining member defining a variable diameter along the retaining member length.

Figure 1:
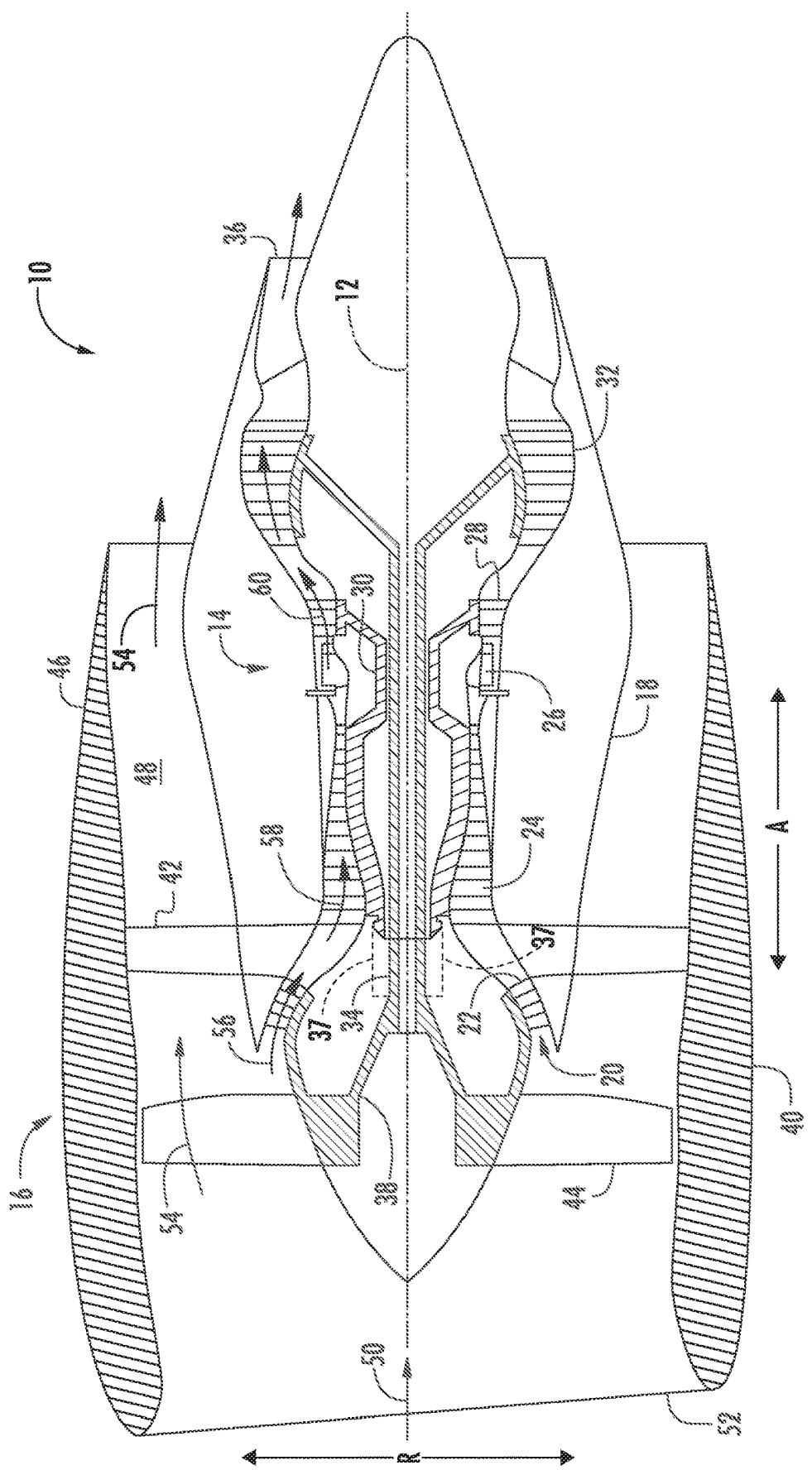
FIG. 1 illustrates a cross-sectional view of one embodiment of a gas turbine engine that may be utilized within an aircraft in accordance with aspects of the present subject matter, particularly illustrating the gas turbine engine configured as a high-bypass turbofan jet engine.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The terms "communicate," "communicating," "communicative," and the like refer to both direct communication as well as indirect communication such as through a memory system or another intermediary system.

A frangible airfoil for gas turbine engines is generally provided. The airfoil may include a plurality of composite plies extending from a leading edge to a trailing edge and between a tip a root. The airfoil may include a retaining member extending at least partially between the leading edge and trailing edge. Further, the retaining member may define a frangible line separating a frangible airfoil portion and a residual airfoil portion. The residual airfoil portion may extend between the frangible line and an airfoil root along a span. Further, the airfoil may define the frangible airfoil portion extending between the frangible line and the tip along the span. The frangible airfoil portion positioned radially outward from the frangible line may include a reduced bending stiffness at the frangible line or a reduced overall bending stiffness such that the frangible airfoil portion may break-off or bend during a failure mode of the airfoil. More particularly, the frangible airfoil portion and residual airfoil portion may each include one or more composite plies wrapped around the retaining member that may break and/or break away from the retaining member after being subjected to a sufficient load on the airfoil, reducing the bending stiffness. The embodiments generally shown and described herein may enable a controlled and consistent failure of the airfoil, such as a fan blade, following a failure event, such as a hard rub against a surrounding fan case. The embodiments generally described herein enable the airfoil to deform or detach at a desired span of the airfoil to mitigate load transfer to a surrounding casing. The embodiments generally provided herein may further enable the airfoil to deform or detach such that excessive or extreme unbalance of the fan rotor may be reduced following a failure event, such as airfoil liberation, foreign object damage (e.g., bird strikes, icing, etc.), or loss of lube or damper to a bearing assembly.

Referring now to the drawings, FIG. 1 illustrates a cross-sectional view of one embodiment of a gas turbine engine 10 that may be utilized within an aircraft in accordance with aspects of the present subject matter. More particularly, for the embodiment of FIG. 1, the gas turbine engine 10 is a high-bypass turbofan jet engine, with the gas turbine engine 10 being shown having a longitudinal or axial centerline axis 12 extending therethrough along an axial direction A for reference purposes. The gas turbine engine 10 further defines a radial direction R extended from the centerline 12. Although an exemplary turbofan embodiment is shown, it is anticipated that the present disclosure can be equally applicable to turbomachinery in general, such as an open rotor, a turboshaft, turbojet, or a turboprop configuration, including marine and industrial turbine engines and auxiliary power units.

In general, the gas turbine engine 10 includes a core gas turbine engine (indicated generally by reference character 14) and a fan section 16 positioned upstream thereof. The core engine 14 generally includes a substantially tubular outer casing 18 that defines an annular inlet 20. In addition, the outer casing 18 may further enclose and support a low pressure (LP) compressor 22 for increasing the pressure of the air that enters the core engine 14 to a first pressure level. A multi-stage, axial-flow high pressure (HP) compressor 24 may then receive the pressurized air from the LP compressor 22 and further increase the pressure of such air. The pressurized air exiting the HP compressor 24 may then flow to a combustor 26 within which fuel is injected into the flow of pressurized air, with the resulting mixture being combusted within the combustor 26. The high energy combustion products 60 are directed from the combustor 26 along the hot gas path of the gas turbine engine 10 to a high pressure (HP) turbine 28 for driving the HP compressor 24 via a high pressure (HP) shaft or spool 30, and then to a low pressure (LP) turbine 32 for driving the LP compressor 22 and fan section 16 via a low pressure (LP) drive shaft or spool 34 that is generally coaxial with HP shaft 30. After driving each of turbines 28 and 32, the combustion products 60 may be expelled from the core engine 14 via an exhaust nozzle 36 to provide propulsive jet thrust.

Figure 2:
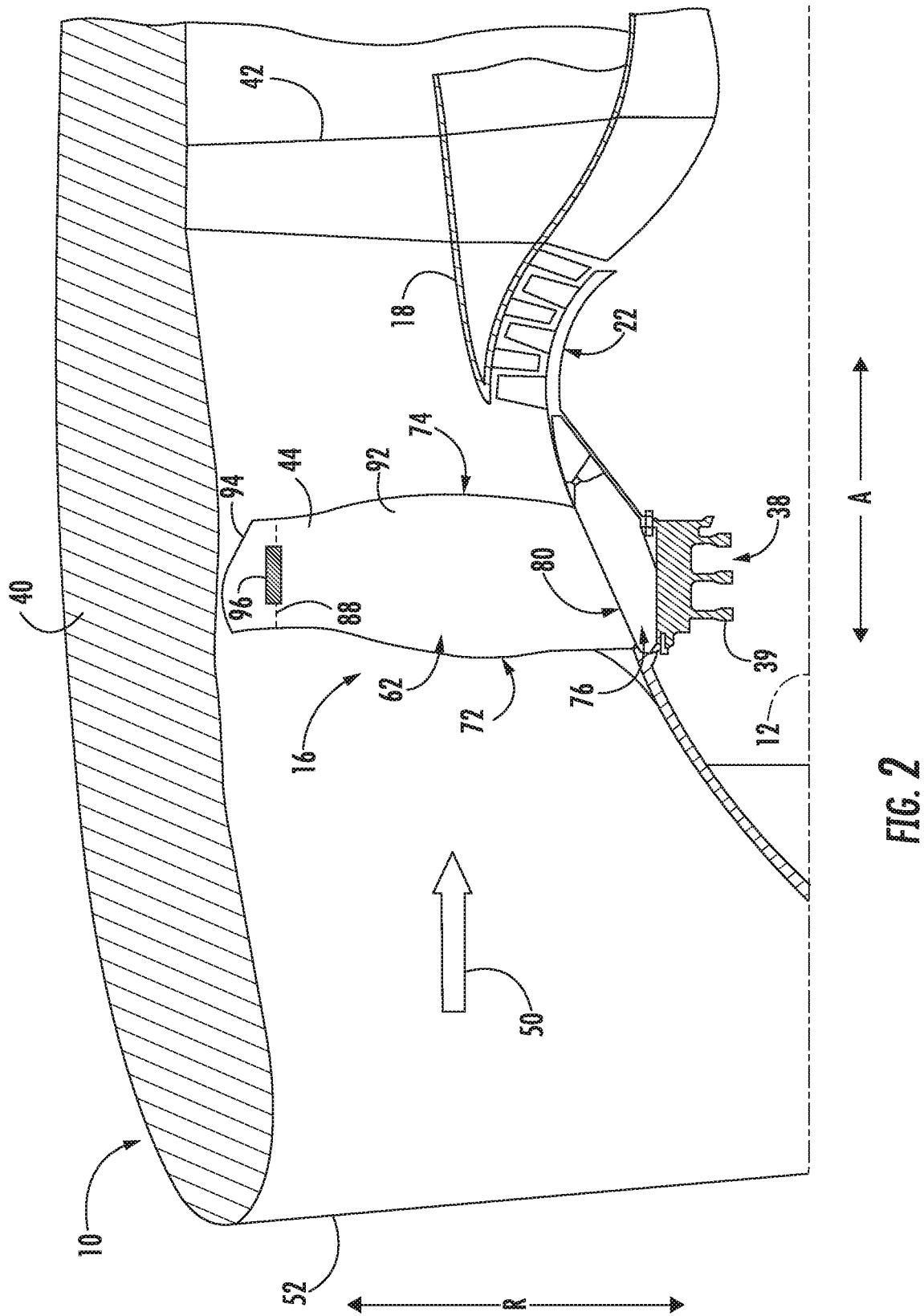
FIG. 2 illustrates a cross-sectional view of the fan section of FIG. 1 in accordance with aspects of the present subject matter, particularly illustrating a fan blade of the fan section.

Additionally, as shown in FIGS. 1 and 2, the fan section 16 of the gas turbine engine 10 generally includes a rotatable, axial-flow fan rotor 38 configured to be surrounded by an annular fan casing 40. In particular embodiments, the LP shaft 34 may be connected directly to the fan rotor 38 or rotor disk 39, such as in a direct-drive configuration. In alternative configurations, the LP shaft 34 may be connected to the fan rotor 38 via a speed reduction device 37 such as a reduction gear gearbox in an indirect-drive or geared-drive configuration. Such speed reduction devices may be included between any suitable shafts/spools within the gas turbine engine 10 as desired or required.

It should be appreciated by those of ordinary skill in the art that the fan casing 40 may be configured to be supported relative to the core engine 14 by a plurality of substantially radially-extending, circumferentially-spaced outlet guide vanes 42. As such, the fan casing 40 may enclose the fan rotor 38 and its corresponding fan rotor blades (fan blades 44). Moreover, a downstream section 46 of the fan casing 40 may extend over an outer portion of the core engine 14 so as to define a secondary, or by-pass, airflow conduit 48 that provides additional propulsive jet thrust.

During operation of the gas turbine engine 10, it should be appreciated that an initial airflow (indicated by arrow 50) may enter the gas turbine engine 10 through an associated inlet 52 of the fan casing 40. The air flow 50 then passes through the fan blades 44 and splits into a first compressed air flow (indicated by arrow 54) that moves through the by-pass conduit 48 and a second compressed air flow (indicated by arrow 56) which enters the LP compressor 22. The pressure of the second compressed air flow 56 is then increased and enters the HP compressor 24 (as indicated by arrow 58). After mixing with fuel and being combusted within the combustor 26, the combustion products 60 exit the combustor 26 and flow through the HP turbine 28. Thereafter, the combustion products 60 flow through the LP turbine 32 and exit the exhaust nozzle 36 to provide thrust for the gas turbine engine 10.

Figure 3:
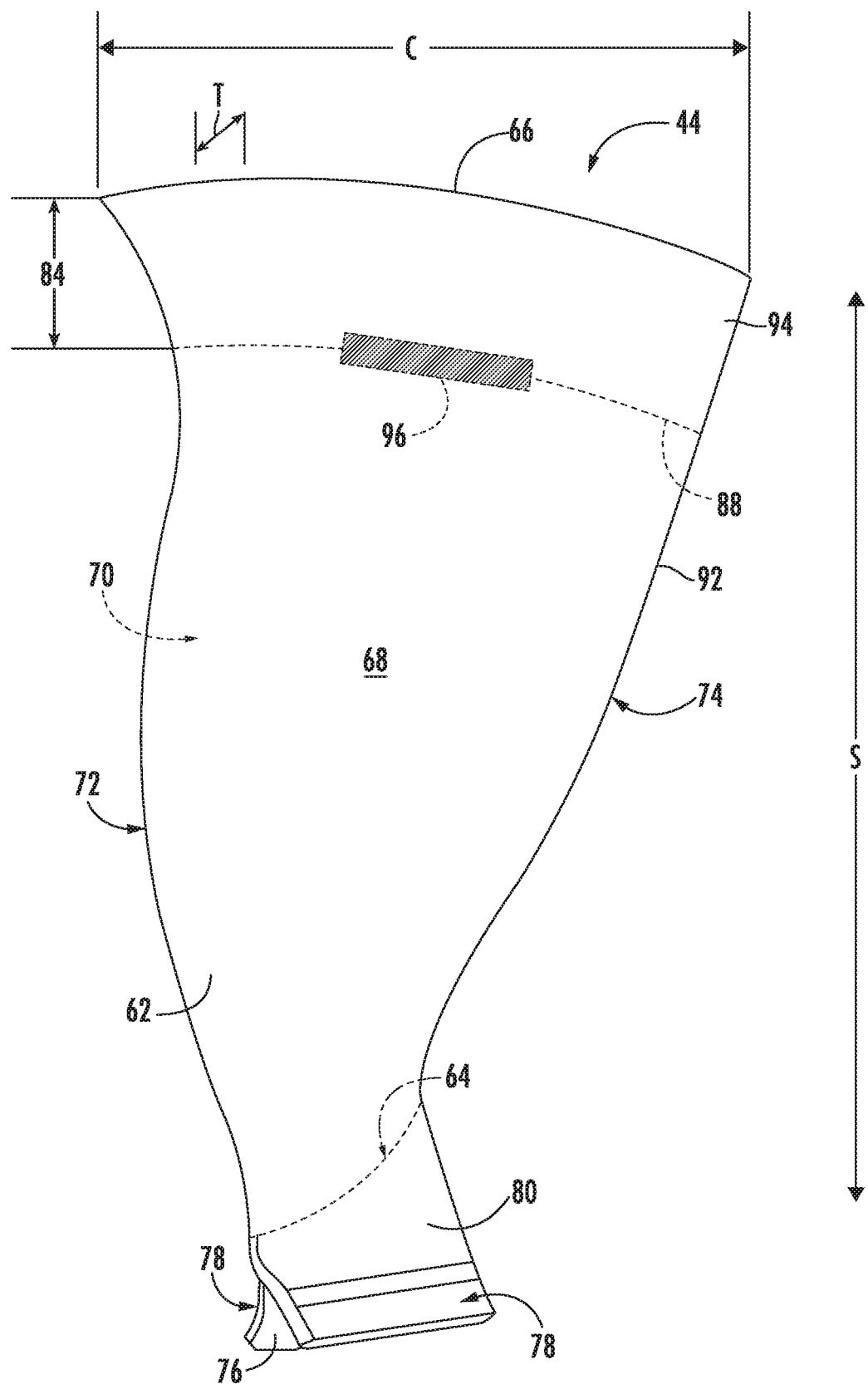
FIG. 3 illustrates a fan blade of the fan section of FIGS. 1 and 2 in accordance with aspects of the present subject matter, particularly illustrating a frangible airfoil portion and a residual airfoil portion.

Referring to FIGS. 2 and 3, exemplary airfoil 62 embodiments are provided in the context of a fan blade 44. Although the illustrated airfoils 62 are shown as part of a fan blade 44, it is understood that the following discussion of an airfoil 62 may be equally applied to another airfoil embodiment, e.g., a stator vane or rotor blade of a compressor 22, 24 and/or turbine 28, 32 (see FIG. 1). As shown, each fan blade 44 extends radially outwardly along a span S from an airfoil root 64 to an airfoil tip 66. A pressure side 68 and a suction side 70 of the airfoil 62 extend from the airfoil's leading edge 72 to a trailing edge 74 and between the airfoil root 64 and airfoil tip 66 along the span S. Further, it should be recognized that airfoil 62 may define a chord C at each point along the span S between the airfoil root 64 and the airfoil tip 66. Further, the chord C may vary along the span S of the airfoil 62. For instance, in the depicted embodiment, the chord C increases along the span S toward the airfoil tip 66. Though, in other embodiments, the chord C may be approximately constant throughout the span S or may decrease from the airfoil root 64 to the airfoil tip 66.

As shown particularly in FIG. 3, the airfoil 62 may define a thickness T extending between the pressure side 68 and the suction side 70 at each point along the span S. In certain embodiments, the thickness T may be approximately constant throughout the span S of the airfoil 62. In other embodiments, the airfoil 62 may define a variable thickness T between the airfoil root 64 and the airfoil tip 66. For instance, the thickness T may generally decrease along the span S toward the airfoil tip 66. Additionally, the airfoil 62 may define an approximately constant thickness T along the chord C at each point along the span. Or, in other embodiments, at least one point along the span S of the airfoil 62 may define a variable thickness T along the chord C. For instance, the airfoil 62 may define a maximum thickness at a position along the chord C at each point along the span S.

Optionally, each fan blade 44 includes an integral component having an axial dovetail 76 with a pair of opposed pressure faces 78 leading to a transition section 80. When mounted within the gas turbine engine 10, as illustrated in FIG. 2, the dovetail 76 is disposed in a dovetail slot of the fan rotor disk 39, thereby attaching the fan blades 44 to the fan rotor 38.

The airfoil 62 may include a plurality of composite plies 82 (see, e.g., FIGS. 4 and 5) extending from the leading edge 72 to the trailing edge 74 and between the airfoil tip 66 and the airfoil root 64. For instance, one or more composite plies 82 may extend from the airfoil tip 66 to the airfoil root 64.

Or, in further embodiments, one or more composite plies 82 may be positioned in an end-to-end arrangement. For instance, two composite plies 82 may be arranged end-to-end to extend along the span S from the airfoil root 64 to the airfoil tip 66. Though, in further embodiments, more than two composite plies 82 may be arranged end-to-end to extend along the span S, such as three or more composite plies 82.

As shown, the airfoil 62 may further include a retaining member 96 extending at least partially between the leading edge 72 and the trailing edge 74. In one embodiment, the retaining member 96 may extend along the chord C at a point along the span S of the retaining member 96. For instance, the retaining member 96 may extend parallel to the chord C at the point along the span S of the retaining member 96. In another embodiment, the retaining member 96 may define an arc (see, e.g., FIG. 8) as the retaining member 96 extends between the leading edge 72 and the trailing edge 74. For instance, the retaining member 96 may be contoured to the shape of at least one of the pressure side 68 or suction side 70. Further, the retaining member 96 may be contoured to a camber line of the airfoil 62. In other embodiments, the retaining member 96 may define an arc oriented toward the airfoil root 64 or the airfoil tip 66. In another embodiment, the retaining member 96 may extend at least partially along the span S. For example, the retaining member 96 may extend partially toward the airfoil root 64 or the airfoil tip 66. The retaining member 96 may define a frangible line 88 extending at least partially along the chord C at the point along the span S of the retaining member 96. The frangible line 88 may separate a frangible airfoil portion 94 and a residual airfoil portion 92.

The frangible airfoil portion 94 may generally be positioned toward the airfoil tip 66 and extend between the leading edge 72 and trailing edge 74 and between the airfoil tip 66 and the frangible line 88. The residual airfoil portion 92 may extend from the frangible line 88 to the airfoil root 64 along the span S. As explained in more detail in regards to FIGS. 4 and 5, the frangible airfoil portion 94 may include a plurality of composite plies 86. Further, at least one composite ply 82 of the first plurality of composite plies 86 may wrap around the retaining member 96 (see, e.g., FIGS. 4 and 5). The residual airfoil portion 92 may include a second plurality of composite plies 90. At least one composite ply 82 of the second plurality of composite plies 90 may wrap around the retaining member 96. It should be recognized that one or more composite plies 82 may be a part of both the first plurality of composite plies 86 and the second plurality of composite plies 90. For example, at least one composite ply 82 may extend the entire span S from the airfoil root 64 to the airfoil tip 66.

As further illustrated in FIG. 3, the frangible line 88 may generally extend along the chord C between the leading edge 72 and the trailing edge 74. Further, it should be recognized that the frangible line 88 may be defined at the same orientation as the retaining member 96. More particularly, the retaining member 96 may define the frangible line 88 extending between the leading edge 72 and the trailing edge 74. It should be recognized that the frangible line 88 may generally extend along the chord C at approximately the same point along the span S. In other embodiments, the frangible line 88 may at least partially extend radially inward or outward (e.g., along the span S) as the frangible line 88 extends axially along the chord C toward the trailing edge 74. For instance, in certain embodiments, the frangible line 88 may be defined along the chord C of one point along the span S. In other embodiments, the frangible line 88 may extend along a variable percentage of the span S from the leading edge 72 to the trailing edge 74.

In one embodiment, the frangible airfoil portion 94 may extend along at least 10% of the span S from the airfoil tip 66, such as along a chord C at one point along the span. More particularly, as illustrated, the frangible airfoil portion 94 may define a frangible height 84 extending between the airfoil tip 66 and the frangible line 88 and/or the retaining member 96. As such, the frangible height 84 may extend along at least 10% of the span S between the leading edge 72 and the trailing edge 74. In another embodiment, the frangible airfoil portion 94 and/or the frangible height 84 may extend along at least 15% but less than 50% of the span S between the leading edge 72 and the trailing edge 74. The frangible airfoil portion 94 may define a reduced bending stiffness at the frangible line 88 and/or have a reduced overall bending stiffness compared to the residual airfoil portion 92 following an even creating imbalance on the airfoil 62, as described in more detail below in regards to FIGS. 4 and 5.

Referring particularly to the exemplary airfoil 62 of FIG. 3, the airfoil 62 may be configured to fracture, break, or liberate at approximately the frangible line 88 up to the airfoil tip 66 (e.g., the frangible airfoil portion 94) following a loading or impact upon the airfoil 62. For example, the airfoil 62 configured as the fan blade 44 within the fan casing 40 or nacelle of the gas turbine engine 10 (FIG. 1) may be configured to detach, decouple, deform, break, or liberate the frangible airfoil portion 94 of the airfoil 62 at or above the frangible line 88. In one non-limiting example, the frangible airfoil portion 94 of the airfoil 62 may be defined as the difference in spanwise dimensions of the frangible airfoil portion 94 and the residual airfoil portion 92. For example, the frangible airfoil portion 94 may be defined within approximately 3% to approximately 15% of the total span S from the airfoil tip 66.

Figure 4:
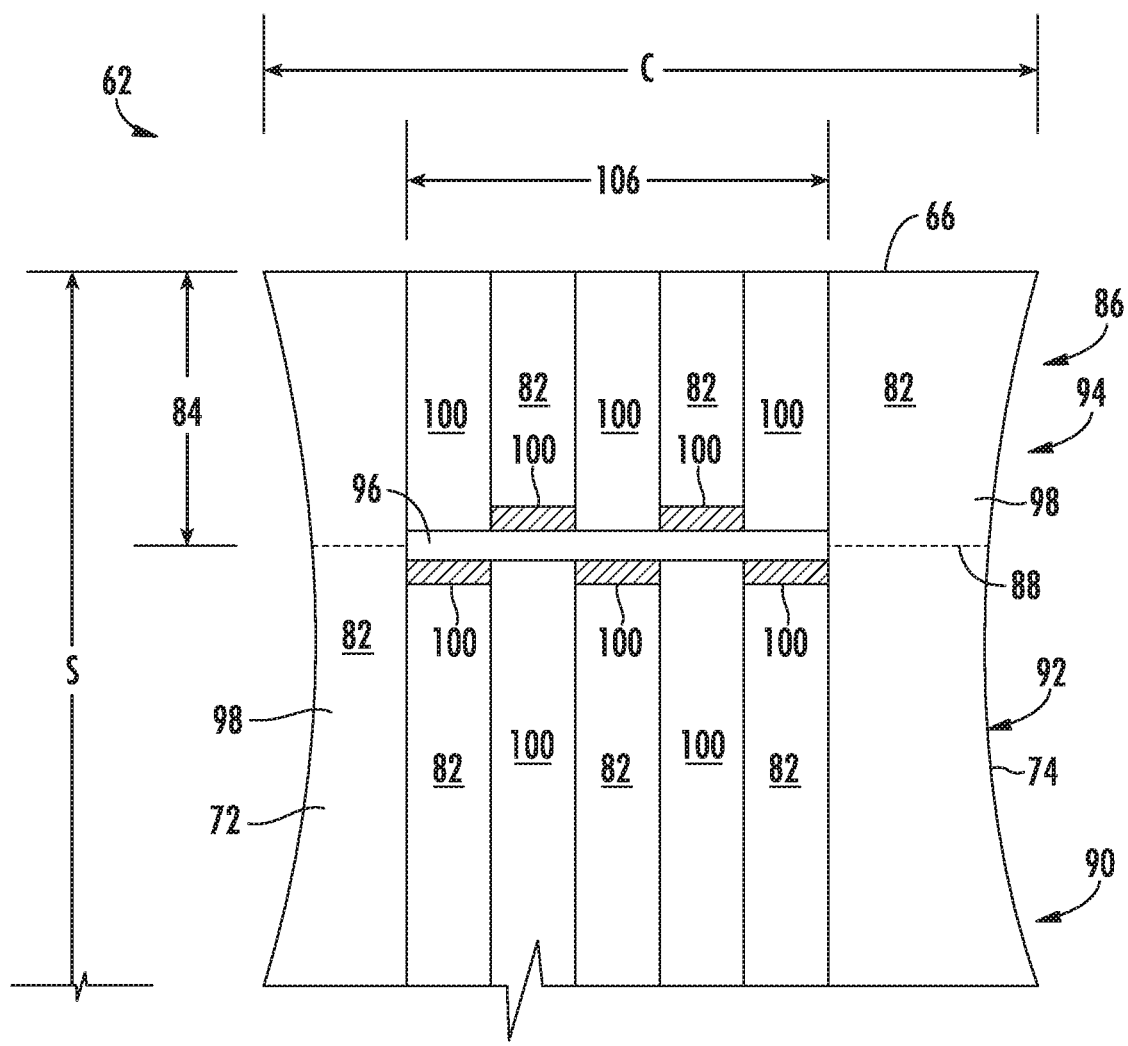
FIG. 4 illustrates one embodiment of the frangible airfoil portion in accordance with aspects of the present subject matter, particularly illustrating a cross-section along a chord and span of the airfoil.
Figure 5:
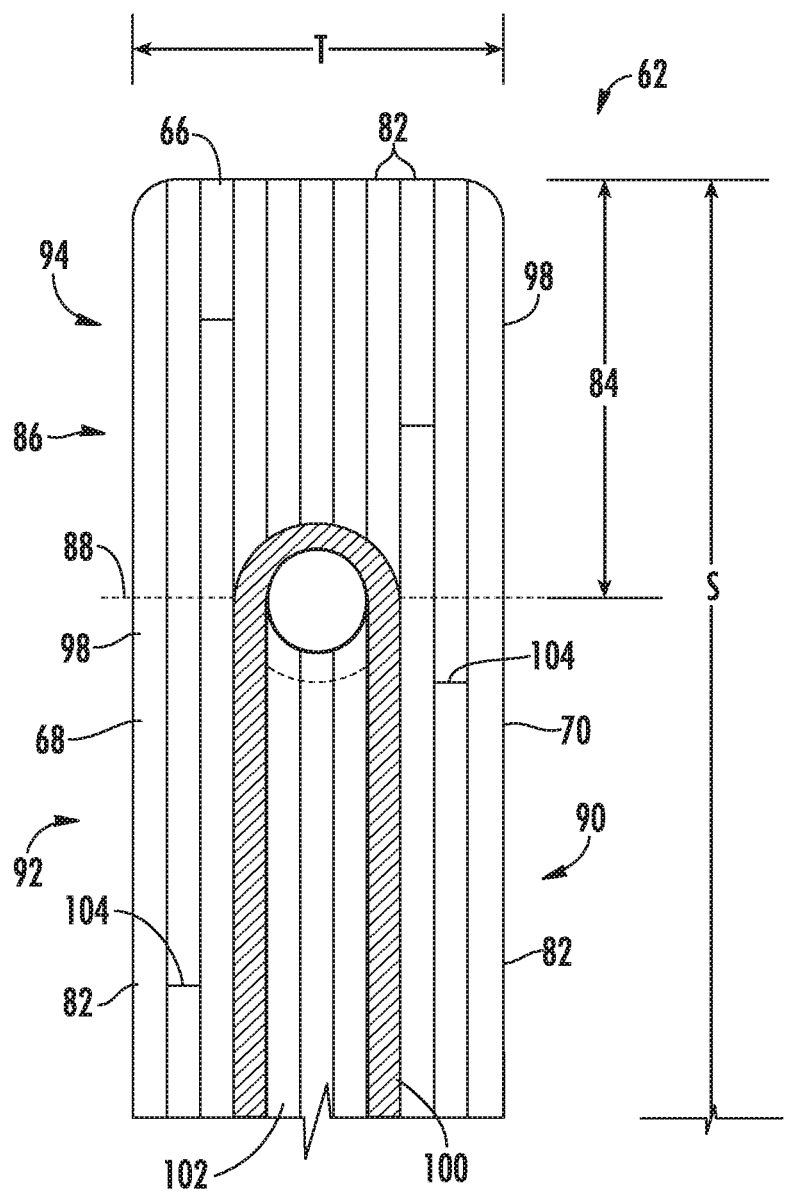
FIG. 5 illustrates another view of the frangible airfoil portion in accordance with aspects of the present subject matter, particularly illustrating a cross-section along the chord and a thickness of the airfoil.
Figure 8:
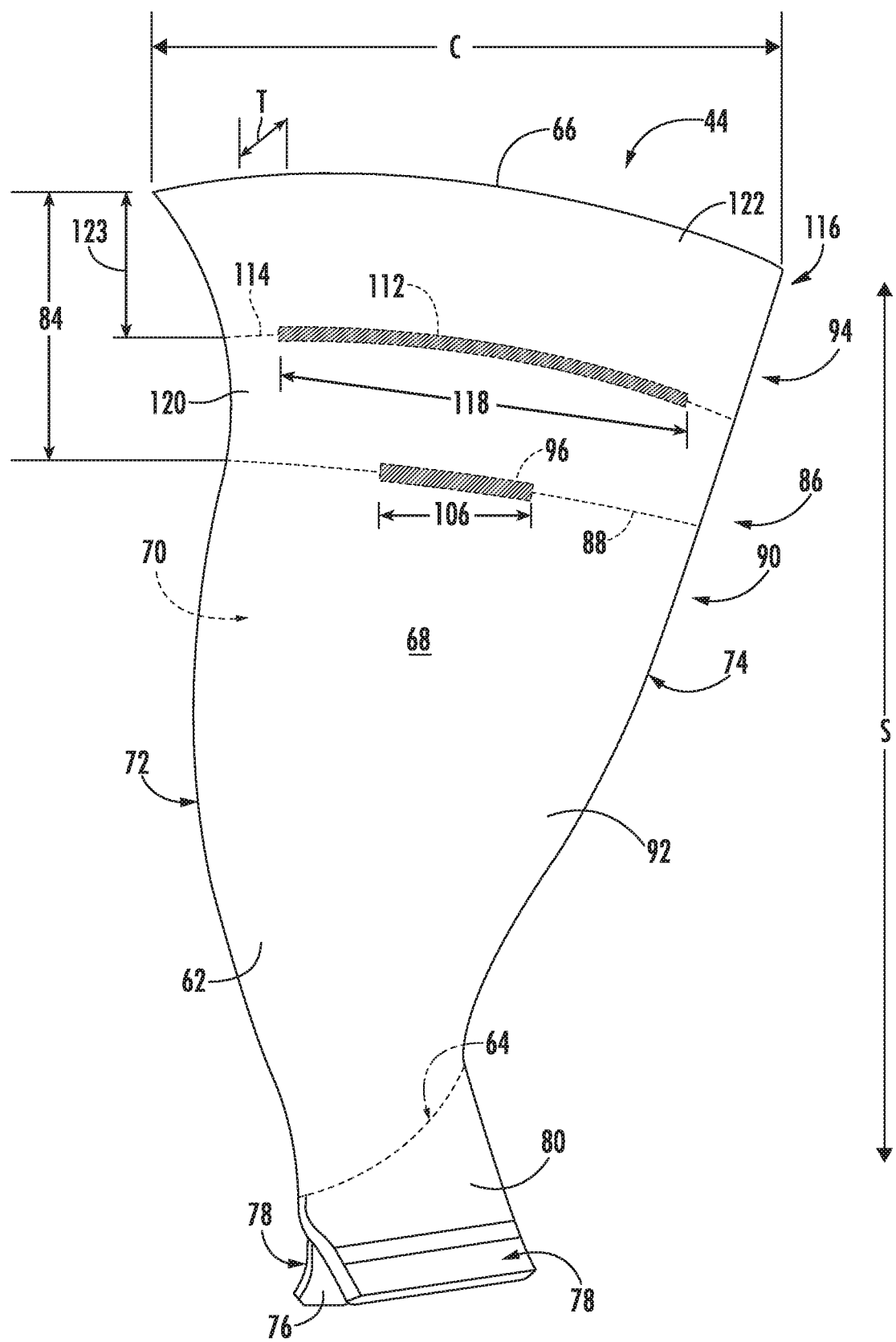
FIG. 8 illustrates another embodiment of the airfoil in accordance with aspects of the present subject matter, particularly illustrating an airfoil including a second retaining member.

During operation of the gas turbine engine 10, such as following an event generating substantial imbalance in the fan rotor 38 or LP shaft 34, the frangible airfoil portion 94, e.g., of the fan blade 44, as shown and described in various embodiments in FIGS. 4, 5, and 8 may be configured to deform or partially or fully detach from the remainder of the airfoil 62, e.g., along the frangible line 88. Further, the frangible airfoil portion 94 may detach while leaving all of or at least a portion of the residual airfoil portion 92. Events generating substantial unbalance in the fan rotor 38 and/or LP shaft 34 may include, but are not limited to, foreign object damage (e.g., bird strikes, ice ingestion, other debris, etc.) or fan blade 44 detachment. Detaching or decoupling the frangible airfoil portion 94 may reduce undesired unbalance or vibrations as the fan rotor 38 and/or LP shaft 34 continue to rotate. Furthermore, the embodiments of the airfoil 62 generally shown and described in regard to FIGS. 4, 5, and 8 may enable a lighter fan casing 40 or nacelle, such as reducing an amount of metal materials or abradable material of the fan casing 40 or nacelle.

In one embodiment, the airfoil 62, the frangible airfoil portion 94, and/or the residual airfoil portion 92 may include at least one composite. For instance, the airfoil 62 may be formed at least partially from a ceramic matrix composite. More particularly, in certain embodiments, the airfoil 62 may be formed from one or more composite plies 82 configured as ceramic matrix composite prepreg plies.

Composite materials may include, but are not limited to, metal matrix composites (MMCs), polymer matrix composites (PMCs), or ceramic matrix composites (CMCs). Composite materials, such as may be utilized in the airfoil 62, generally comprise a fibrous reinforcement material embedded in matrix material, such as polymer, ceramic, or metal material. The reinforcement material serves as a load-bearing constituent of the composite material, while the matrix of a composite material serves to bind the fibers together and act as the medium by which an externally applied stress is transmitted and distributed to the fibers.

Exemplary CMC materials may include silicon carbide (SiC), silicon, silica, or alumina matrix materials and combinations thereof. Ceramic fibers may be embedded within the matrix, such as oxidation stable reinforcing fibers including monofilaments like sapphire and silicon carbide (e.g., Textron's SCS-6), as well as rovings and yarn including silicon carbide (e.g., Nippon Carbon's NICALON®, Ube Industries' TYRANNO®, and Dow Corning's SYLRAMIC®), alumina silicates (e.g., Nextel's 440 and 480), and chopped whiskers and fibers (e.g., Nextel's 440 and SAFFIL®), and optionally ceramic particles (e.g., oxides of Si, Al, Zr, Y, and combinations thereof) and inorganic fillers (e.g., pyrophyllite, wollastonite, mica, talc, kyanite, and montmorillonite). For example, in certain embodiments, bundles of the fibers, which may include a ceramic refractory material coating, are formed as a reinforced tape, such as a unidirectional reinforced tape. A plurality of the tapes may be laid up together (e.g., as the composite plies 82) to form a preform component. The bundles of fibers may be impregnated with a slurry composition prior to forming the preform or after formation of the preform. The preform may then undergo thermal processing, such as a cure or burn-out to yield a high char residue in the preform, and subsequent chemical processing, such as melt-infiltration with silicon, to arrive at a component formed of a CMC material having a desired chemical composition.

Similarly, in various embodiments, PMC materials may be fabricated by impregnating a fabric or unidirectional tape with a resin (prepreg), followed by curing. For example, multiple layers of prepreg plies (e.g., the composite plies 82) may be stacked to the proper thickness and orientation for the part, and then the resin may be cured and solidified to render a fiber reinforced composite part. As another example, a die may be utilized to which the uncured layers of prepreg may be stacked to form at least a portion of the composite component. The die may be either a closed configuration (e.g., compression molding) or an open configuration that utilizes vacuum bag forming. For instance, in the open configuration, the die forms one side of the blade (e.g., the pressure side 68 or the suction side 70). The PMC material is placed inside of a bag and a vacuum is utilized to hold the PMC material against the die during curing. In still other embodiments, the airfoil 62 may be at least partially formed via resin transfer molding (RTM), light resin transfer molding (LRTM), vacuum assisted resin transfer molding (VARTM), a forming process (e.g. thermoforming), or similar.

Prior to impregnation, the fabric may be referred to as a "dry" fabric and typically comprises a stack of two or more fiber layers. The fiber layers may be formed of a variety of materials, non-limiting examples of which include carbon (e.g., graphite), glass (e.g., fiberglass), polymer (e.g., Kevlar®) fibers, and metal fibers. Fibrous reinforcement materials can be used in the form of relatively short chopped fibers, generally less than two inches in length, and more preferably less than one inch, or long continuous fibers, the latter of which are often used to produce a woven fabric or unidirectional tape. Other embodiments may include other textile forms such as plane weave, twill, or satin.

In one embodiment, PMC materials can be produced by dispersing dry fibers into a mold, and then flowing matrix material around the reinforcement fibers. Resins for PMC matrix materials can be generally classified as thermosets or thermoplastics. Thermoplastic resins are generally categorized as polymers that can be repeatedly softened and flowed when heated and hardened when sufficiently cooled due to physical rather than chemical changes. Notable example classes of thermoplastic resins include nylons, thermoplastic polyesters, polyaryletherketones, and polycarbonate resins. Specific examples of high performance thermoplastic resins that have been contemplated for use in aerospace applications include polyetheretherketone (PEEK), polyetherketoneketone (PEKK), polyetherimide (PEI), and polyphenylene sulfide (PPS). In contrast, once fully cured into a hard rigid solid, thermoset resins do not undergo significant softening when heated but, instead, thermally decompose when sufficiently heated. Notable examples of thermoset resins include epoxy, bismaleimide (BMI), and polyimide resins.

Referring now to FIGS. 4 and 5, the frangible airfoil portion 94 is illustrated in accordance with aspects of the present subject matter. Particularly, FIG. 4 illustrates a cross-section of the airfoil 62 along the chord C and the span S. FIG. 5 illustrates a cross-section of the airfoil 62 along the span S and the thickness T. It should be recognized that the retaining member 96 may be positioned internally within the airfoil 62. As shown particularly in FIG. 5, the composite plies 82 (e.g., the first and/or second plurality of composite plies 86, 90) may include exterior plies 98. Further, the exterior plies 98 may enclose the retaining member 96 within the airfoil 62. The exterior plies 98 may define the aerodynamic profile of the airfoil 62, such as the chord C and thickness T of the airfoil 62 along the span S. The exterior plies 98 may also provide rigidity to the airfoil 62.

The plurality of composite pies 82 may also include wrap plies 100. The wrap plies 100 may be wrapped around the retaining member 96. Further, the wrap plies 100 may be bonded to the retaining member during a process to form the airfoil 62. For instance, as described above, the matrix of the composite may bond the wrap plies 100 to the retaining member 96. In the illustrated embodiment of FIG. 5, the second plurality of composite plies 90 may include the wrap plies 100 extending from the airfoil root 64 (see, e.g., FIGS. 2 and 3). It should be recognized that one or more wrap plies 100 may wrap around the retaining member 96 from both the first plurality of composite plies 86 and the second plurality of composite plies 90. As shown, particularly in FIG. 4, wrap plies 100 from the first plurality of composite plies 86 and the second plurality of composite plies 90 may be wrapped around the retaining member 96. For example, wrap plies 100 from the first and second pluralities of composite plies 86, 90 may alternate along the chord C. As further illustrated in FIG. 5, the plurality of composite plies 82 may include one or more interior plies 102. For example, in certain embodiments, the wrap ply(ies) 100 may surround the interior ply(ies) 102. Such interior ply(ies) 102 may provide additional rigidity to the airfoil 62. Though, in other embodiments, it should be recognized that the wrap ply(ies) 100 may contact itself along a portion of the span S, and thus not leave a space for the interior ply(ies) 102.

In certain embodiments, one or more of the composite plies 82 may be configured as continuous composite plies that extend the full span S from the airfoil root 64 to the airfoil tip 66 (such as any of the exterior plies 98). As shown particularly in FIG. 5, one or more composite plies 82 (such as the exterior and/or interior plies 98, 102) may be arranged end-to-end along the span S of the airfoil 62. In one embodiment, one or more butt joints 104 may join at least one composite ply 82 positioned toward the airfoil root 64 with at least one composite ply 82 positioned toward the airfoil tip 66 relative to the composite ply 82 positioned toward the airfoil root 64.

The butt joint(s) 104 may include, for instance, a resin pool that frangibly attaches the two composite ply segments 82. In certain embodiments the resin pool of the butt joint 104 will maintain a constant thickness along the span S or the chord C. The resin may include a polymeric resin or epoxy. Optionally, the polymeric resin may include a material similar to or discrete from a matrix reinforcement included in the individual composite plies 82. Though, in other embodiments, it should be recognized that composite plies 82, such as composite plies 82 of the first plurality of composite plies 86 and the second plurality of composite plies 90, may be joined together using any means. For example, the composite plies 82 may be arranged end-to-end and fixed during a process to finish forming the composite component. In other embodiments, the composite plies 82 may be adhered or coupled together.

Referring now particularly to FIG. 4, the retaining member 96 may define a retaining member length 106 along the chord C at the point along the span S of the retaining member 96. In certain embodiments, the retaining member length 106 may extend along at least 10% but less than or equal to 100% of the chord C at the point along the span S of the retaining member 96. In a further embodiment, the retaining member length 106 may extend along at least 33% but less than 80% of the chord C at the point along the span S of the retaining member 96.

Referring now generally to FIGS. 4 and 5, in certain embodiments, the residual airfoil portion 92 may define a portion of the airfoil 62 with a first overall bending stiffness. Further, under normal operating conditions, the entire airfoil 62 may define the first overall bending stiffness. The frangible airfoil portion 94 may be configured to define a portion of the airfoil 62 with a second bending stiffness. For instance, after an event generating imbalance, one or more of the wrap plies 100 may break from the forces acting on the airfoil 62 (e.g., a load on the fan blade(s) 44 from contacting the fan casing 40). Such forces may be sufficient to break the wrap ply(ies) 100 themselves. In certain situations, a portion of the wrap plies 100 may break the bond between the wrap plies 100 and the retaining member 96.

Breaking the wrap plies 100 and/or the bond between the wrap plies 100 and the retaining member 96 may reduce the bending stiffness at the retaining member 96 along the frangible line 88. For instance, the retaining member 96 may partially create a hinge at the frangible line 88 such that the frangible airfoil portion 94 may bend, deflect, or separate from the residual airfoil portion 92 following an even creating imbalance on the airfoil 62. Further, it should be recognized that severed wrap plies 100 or wrap plies 100 no longer bonded to the retaining member 96 may reduce the bending stiffness of the frangible airfoil portion 94 positioned toward the airfoil tip 66. As such, the frangible airfoil portion 94 may be configured to include a second overall bending stiffness less than the first overall bending stiffness after an event severing the wrap plies 100 or breaking the bonds of the wrap plies 100 with the retaining member 96. Moreover a reduced bending stiffness at the retaining member 96 and/or a reduced bending stiffness through the frangible airfoil portion 94 (e.g., the second overall bending stiffness) along the span S may allow frangible airfoil portion 94 to fracture, break, liberate, decouple, deform, deflect, etc. at or above the frangible line 88 as described above.

Referring now to FIG. 6, one embodiment of the retaining member 96 is illustrated in accordance with aspects of the present subject matter. Particularly, FIG. 6 illustrates a retaining member 96 defining a retaining member diameter 108 extending along the retaining member length 106. In the depicted embodiment, the retaining member diameter 108 may be a constant diameter. For instance, in various embodiments, the retaining member 96 may be configured as a pin. It should be appreciated that the retaining member diameter 108 and/or the retaining member length 106 may determine the degree the bending stiffness of the frangible airfoil portion 94 and/or the bending stiffness at the frangible line 88 is reduced. For example, a retaining member length 106 extending along a greater percentage of the chord C may reduce the number of exterior plies 98 that may be positioned toward the leading and trailing edges 72, 74. Further, the larger the diameter 108 of the retaining member 96 relative to the thickness T the fewer exterior plies 98 that may be positioned toward the pressure and suctions sides 68, 70. It should be appreciated that by reducing the number of exterior plies 98 that extend through the frangible line 88 may also reduce the bending stiffness at the frangible line 88 and/or the frangible airfoil portion 94 following an event creating imbalance. Contrarily, a smaller retaining member 96 (e.g., a shorter retaining member and/or smaller retaining member diameter 108) may allow an increased number of exterior plies 98 to extend through the frangible line 88. As such, the reduction of the bending stiffness at the frangible line 88 and/or the frangible airfoil portion 94 following an event creating imbalance may be less than with a retaining member 96 defining a longer retaining member length 106 and/or larger retaining member diameter 108.

Referring now to FIG. 7, another embodiment of the retaining member 96 is illustrated in accordance with aspects of the present subject matter. Particularly, FIG. 7 illustrates a retaining member 96 with a variable diameter. For instance, the retaining member diameter 108 may vary along the retaining member length 106. As illustrated, the retaining member diameter 108 may define a smooth transition along the retaining member length 106. In other embodiments, the retaining member 96 may define distinct portions along the retaining member length 106 with discrete retaining member diameters 108. Moreover, the retaining member diameter 108 may define a maximum diameter 110 at a position along the retaining member length 106. For example, the maximum diameter 110 may be defined at approximately the center of the retaining member length 106. Though, in other embodiments, the maximum diameter 110 may be defined at any position along the retaining member length 106.

It should be appreciated that portions of the retaining member 96 with a larger retaining member diameter 108 may be configured to reduce the bending stiffness at the frangible line 88 and/or the frangible airfoil portion 94 to a greater degree than portions of the retaining member 96 with a smaller retaining member diameter 108. Further, the maximum diameter 110 may be positioned at approximately the maximum thickness T of the airfoil 62 (e.g., FIG. 3). More particularly, a chordwise position of the maximum thickness T of the airfoil 62 may require a greater reduction in the bending stiffness in order to allow the frangible airfoil portion 94 to bend, deflect, and/or detach relative to the residual airfoil portion 92.

In certain embodiments, the retaining member 96 may include at least one of a metal or a composite. For instance, the retaining member 96 may be carbon matrix composite retaining member. In other embodiments, the retaining member 96 may be a pultruded composite rod. In still other embodiments, the retaining member 96 may include a polymer or a wood. It should be appreciated that the retaining member 96 may be formed from any suitable material. In certain embodiments, the retaining member 96 may be formed from a material with a Young's modulus larger than a Young's modulus of the composite plies 82. As such, the wrap plies 100 may be configured to sever and/or break away from the retaining member 96 during an event creating imbalance on the airfoil 62 before breaking, bending, or damaging the retaining member 96.

Referring now to FIG. 8, another embodiment of the airfoil 62 is illustrated in accordance with aspects of the present subject matter. Particularly, FIG. 8 illustrates an airfoil 62 including a second retaining member 112. In such an embodiment, the retaining member 96 may be a first retaining member 96, and the frangible line 88 may be a first frangible line 88. The second retaining member 112 may be configured generally the same as or similar to the first retaining member 96. In such an embodiment, the second retaining member 112 may extend at least partially between the leading edge 72 and the trailing edge 74 at a point along the span S between the airfoil tip 66 and the point along the span S of the first retaining member 96. Further, the second retaining member 112 may define a second frangible line 114 extending at least partially along the chord C at the point along the span S of the second retaining member 112. As such, the second retaining member 112 may extend at least partially along the chord C at the point along the span S of the second retaining member 112.

In the illustrated embodiment, the first plurality of composite plies 86 may extend between the first frangible line 88 and the second frangible line 114. At least one of the composite ply 82 of the first the plurality of composite plies 86 may wrap around the second retaining member 112 (e.g., one more wrap plies 100 as described generally in regards to FIGS. 4 and 5). Further, in such an embodiment, the frangible airfoil portion 94 may further include a third plurality of composite plies 116 extending between the airfoil tip 66 and the second frangible line 114. At least one composite ply 82 of the third plurality of composite plies 116 may wrap around the second retaining member 112 as described in regards to FIGS. 4 and 5. As such, the third plurality of composite plies 116 may include one or more wrap plies 100 wrapped around and adhered to the second retaining member 112, such as during the process to form the composite component. In one embodiment, the second retaining member 112 may extend parallel to the chord C at the point along the span S of the second retaining member 112. Though, in other embodiments, the second retaining member 112 may extend partially along the span S. For example, the second retaining member 112 may extend partially toward the airfoil root 64 and/or the airfoil tip 66.

In one embodiment, the first retaining member 96 may define a first retaining member length 106, and the second retaining member 112 may define a second retaining member length 118 different than the first retaining member length 106. In certain embodiments, the second retaining member length 118 may be longer than the first retaining member length 106. In still further embodiments, the second retaining member 112 may have a retaining member diameter 108 larger than the retaining member diameter 108 of the first retaining member 96. It should be recognized that a second retaining member 112 with a larger retaining member diameter 108 and/or longer second retaining member length 118 may reduce the number of exterior plies 98 that extend through the second frangible line 114. Further, in other embodiments, the airfoil 62 may include additional retaining members within the frangible airfoil portion 94, such as three or more.

The frangible airfoil portion 94 may define a first part 120 between the first frangible line 88 and the second frangible line 114. Moreover, the first part 120 of the frangible airfoil portion 94 may be configured to reduce the bending stiffness at the first frangible line 88 and/or to define the second overall bending stiffness less than the first overall bending stiffness after wrap plies 100 break and/or separate from the first retaining member 96 (such as following an even leading to imbalance). The frangible airfoil portion 94 may define a second part 122 between the second frangible line 114 and the airfoil tip 66. Further, the second part 122 may define a second frangible height 123 extending between the airfoil tip 66 and the second frangible line 114 and/or the second retaining member 112. It should be appreciated that the second frangible height 123 may be less than the first frangible height 84. The second part 122 of the frangible airfoil portion 94 may be configured to reduce the bending stiffness at the second frangible line 114 and/or have a third overall bending stiffness after wrap plies 100 wrapped around the second retaining member 112 break and/or separate from the second retaining member 112, as generally described in regards to FIGS. 4 and 5. It should be appreciated that the third overall bending stiffness and/or the bending stiffness at the second frangible line 114 may be less than the second overall bending stiffness and/or the bending stiffness at the first frangible line 88 after the wrap plies 100 have severed or separated from their respective retaining members 96, 112. More particularly, the first overall bending stiffness may be greater than the second overall bending stiffness, which is greater than the third overall bending stiffness. As such, the bending stiffness of airfoil 62 may be configured to reduce from the airfoil root 64 to the airfoil tip 66.

This written description uses exemplary embodiments to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An airfoil defining a span extending between a root and a tip and a chord at each point along the span extending between a leading edge and a trailing edge, the airfoil comprising:
a retaining member extending at least partially between the leading edge and the trailing edge, wherein the retaining member defines a frangible line extending at least partially along the chord at a point along a span of the retaining member;
a frangible airfoil portion extending between the leading edge and the trailing edge and extending between the tip and the frangible line along the span, wherein the frangible airfoil portion comprises a first plurality of composite plies, wherein at least one composite ply of the first plurality of composite plies wraps around the retaining member; and a residual airfoil portion extending from the frangible line to the root along the span, the residual airfoil portion comprising a second plurality of composite plies, wherein at least one composite ply of the second plurality of composite plies wraps around the retaining member, and wherein the residual airfoil portion meets the frangible airfoil portion at the frangible line.

2. The airfoil of claim 1, wherein the frangible airfoil portion deforms, or partially detaches, or fully detaches relative to the residual airfoil portion at the frangible line following an event creating imbalance.

3. The airfoil of claim 1, wherein the retaining member extends parallel to the chord at the point along the span of the retaining member.

4. The airfoil of claim 1, wherein the retaining member extends at least partially along the span.

5. The airfoil of claim 1, wherein the frangible airfoil portion extends along at least 10% of the span from the tip.

6. The airfoil of claim 1, wherein the frangible airfoil portion extends along at least 15% but less than 50% of the span from the tip.

7. The airfoil of claim 1, wherein the retaining member extends along at least 10% but less than or equal to 100% of the chord at the point along the span of the retaining member.

8. The airfoil of claim 1, wherein the retaining member extends along at least 33% but less than 80% of the chord at the point along the span of the retaining member.

9. The airfoil of claim 1, wherein the retaining member defines a constant diameter along a length of the retaining member.

10. The airfoil of claim 1, wherein the retaining member defines a variable diameter along a length of the retaining member.

11. The airfoil of claim 1, wherein the retaining member comprises at least one of a metal or a composite.

12. The airfoil of claim 1, wherein the retaining member is a first retaining member, the frangible line is a first frangible line, and wherein the airfoil further comprises:

a second retaining member extending at least partially between the leading edge and the trailing edge at a point along the span between the tip and the point along the span of the first retaining member, wherein the second retaining member defines a second frangible line extending at least partially along the chord at the point along the span of the second retaining member, wherein the first plurality of composite plies extends between the first frangible line and the second frangible line, at least one composite ply of the first plurality of composite plies wrapping around the second retaining member, and wherein the frangible airfoil portion further comprises a third plurality of composite plies extending between the tip and the second frangible line, wherein at least one composite ply of the third plurality of composite plies wraps around the second retaining member.

13. The airfoil of claim 12, wherein the first retaining member defines a first length and the second retaining member defines a second length different than the first length, and wherein the second length is longer than the first length.

14. The airfoil of claim 1, wherein at least one of the first plurality of composite plies or the second plurality of composite plies comprises carbon matrix composite plies.

15. The airfoil of claim 1, wherein the retaining member defines an arc as the retaining member extends at least partially between the leading edge and the trailing edge.

16. The airfoil of claim 1, wherein the airfoil is a fan blade of a gas turbine engine.

17. A gas turbine engine defining a central axis, the gas turbine engine comprising:

an engine shaft extending along the central axis;

a compressor attached to the engine shaft and extending radially about the central axis;

a combustor positioned downstream of the compressor to receive a compressed fluid therefrom;

a turbine mounted on the engine shaft downstream of the combustor to provide a rotational force to the compressor; and a plurality of airfoils operably connected to the engine shaft, each of the plurality of airfoils defining a span extending between a root and a tip and a chord at each point along the span extending between a leading edge and a trailing edge, each airfoil comprising:

a retaining member extending at least partially between the leading edge and the trailing edge, wherein the retaining member defines a frangible line extending at least partially along the chord at a point along a span of the retaining member;

a frangible airfoil portion extending between the leading edge and the trailing edge and extending between the tip and the frangible line along the span, wherein the frangible airfoil portion comprises a first plurality of composite plies, wherein at least one composite ply of the first plurality of composite plies wraps around the retaining member; and a residual airfoil portion extending from the frangible line to the root along the span, the residual airfoil portion comprising a second plurality of composite plies, wherein at least one composite ply of the second plurality of composite plies wraps around the retaining member, and wherein the residual airfoil portion meets the frangible airfoil portion at the frangible line.

18. The gas turbine engine of claim 17, further comprising a fan section including the plurality of airfoils configured as fan blades.

19. The gas turbine engine of claim 17, wherein the retaining member extends along at least 33% but less than 80% of the chord at the point along the span of the retaining member.

20. The gas turbine engine of claim 17, wherein the retaining member is a first retaining member, the frangible line is a first frangible line, and wherein the airfoil further comprises:

a second retaining member extending at least partially between the leading edge and the trailing edge at a point along the span between the tip and the point along the span of the first retaining member, wherein the second retaining member defines a second frangible line extending at least partially along the chord at the point along the span of the second retaining member, wherein the first plurality of composite plies extends between the first frangible line and the second frangible line, at least one composite ply of the first plurality of composite plies wrapping around the second retaining member, and wherein the frangible airfoil portion further comprises a third plurality of composite plies extending between the tip and the second frangible line, wherein at least one composite ply of the third plurality of composite plies wraps around the second retaining member.

* * * * *